(12) United States Patent
Devlin, III et al.

(10) Patent No.: US 6,871,583 B2
(45) Date of Patent: Mar. 29, 2005

(54) METHOD AND SYSTEM FOR INDIVIDUAL TIRE RECYCLING

(75) Inventors: Fred G. Devlin, III, Hillsborough, NJ (US); Robert Proniewski, Hillsborough, NJ (US)

(73) Assignee: PHD, LLC, Hillsborough, NJ (US)

( * ) Notice: Subject to any disclaimer, the term of this patent is extended or adjusted under 35 U.S.C. 154(b) by 0 days.

(21) Appl. No.: 10/726,089

(22) Filed: Dec. 2, 2003

(65) Prior Publication Data

US 2004/0107846 A1 Jun. 10, 2004

Related U.S. Application Data

(62) Division of application No. 10/229,791, filed on Aug. 28, 2002, now Pat. No. 6,715,407.

(51) Int. Cl.[7] .......................... B65B 27/06; B30B 15/00
(52) U.S. Cl. ........................... 100/6; 100/12; 100/98 R; 100/220
(58) Field of Search ..................... 100/3, 6, 8, 12, 100/95, 99, 98 R, 220, 264

(56) References Cited

U.S. PATENT DOCUMENTS

| | | | | |
|---|---|---|---|---|
| 4,729,301 A | * | 3/1988 | Smith et al. ................ | 100/43 |
| 4,995,780 A | | 2/1991 | Dietzler ..................... | 414/400 |
| 4,996,920 A | | 3/1991 | Godfrey ..................... | 100/242 |
| 5,121,680 A | * | 6/1992 | Nordberg .................... | 100/12 |
| 5,244,611 A | | 9/1993 | Cristofano et al. ........ | 264/412 |
| 5,304,576 A | | 4/1994 | Martinez ..................... | 521/41 |
| 5,347,919 A | * | 9/1994 | Nordberg .................... | 100/12 |
| 5,590,594 A | | 1/1997 | Pederson .................... | 100/218 |
| 5,676,320 A | | 10/1997 | Merklinger ............. | 241/101.741 |
| 5,718,166 A | | 2/1998 | Phillips ...................... | 100/3 |
| 5,809,875 A | | 9/1998 | Tucker ...................... | 100/100 |
| 5,868,328 A | | 2/1999 | Luoma .................... | 241/101.2 |
| 5,890,425 A | | 4/1999 | Reinert ...................... | 100/39 |
| 6,098,531 A | | 8/2000 | Reinert, Sr. ................ | 100/39 |
| 6,315,223 B1 | | 11/2001 | Reinert ...................... | 241/25 |
| 6,539,850 B1 | | 4/2003 | Parker ...................... | 100/3 |

\* cited by examiner

*Primary Examiner*—Allen Ostrager
*Assistant Examiner*—Jimmy T Nguyen
(74) *Attorney, Agent, or Firm*—Mathews, Collins, Shepherd & McKay, P.A.

(57) ABSTRACT

The method of the present invention for handling scrap tires, includes a step of providing a compacting apparatus to a scrap tire generator, such as a tire retailer. Before compacting the tires, the tire can be marked with a unique identifier assigned to every tire generator. By marking the scrap tires with a unique identifier, the scrap tires can be tracked on their way to the final destination. The compacting apparatus provides volume reduction of the scrap tires individually into a form that can have a reduction of at least fifty percent of original cubic volume. The tires can be pinched to maintain the compacted tire in the compacted form and prevent the compacted tire from regaining its original shape. The compacted scrap tires can be accumulated inside a tire collection enclosure, such as a trailer or dumpster. The collected tires can be transported with much more weight efficient loads of the tires to a transfer station, a recycling facility, or an end user.

11 Claims, 6 Drawing Sheets

METHOD AND SYSTEM FOR INDIVIDUAL TIRE RECYCLING

CROSS REFERENCE TO RELATED APPLICATION

This application is a divisional and claims the benefit of U.S. patent application Ser. No. 10/229,791, filed Aug. 28, 2002, now U.S. Pat. No. 6,715,407, the entirety of which is hereby incorporated by reference into this application.

BACKGROUND OF THE INVENTION

1. Field of the Invention

This invention relates to a method and system for collection, volume reduction, transportation, and tracking of scrap tires.

2. Description of the Related Art

Generally, scrap tire generation in industrialized countries is approximately one passenger car tire equivalent per population and year. It is estimated that 2 to 3 billion scrap tires are stockpiled in illegal or abandoned piles throughout the U.S. The most obvious hazard associated with the uncontrolled disposal and accumulation of large amounts of tires outdoors is the potential for large fires that are extremely detrimental to the environment. Once a large pile of tires catches fire, it is very hard, if not impossible, to extinguish. In some instances, large tire piles have been burning for several months with the fumes being visible for many miles. Also, it has been found that air and soil pollution is even worse if attempts are made to extinguish the fire with foam or water. For this reason, scrap tire fires are often allowed to burn out in a more or less controlled manner until the entire pile is exhausted.

A second problem often caused by illegal tire piles involves disease carrying mosquitoes, which tend to breed in great numbers in the protected water puddles which form in the inside of the tires. Outbreaks of diseases like Encephalitis, Rocky Mountain Fever, West Nile Fever or Malaria have been reported around large tire piles.

Scrap tires are illegally dumped for several reasons: poor enforcement of anti-littering and anti-dumping laws; lack of easily available alternatives; and tire jockeys illegally dumping tires rather than paying tip fees. There is virtually no way of identifying the discarded tires as to where they originated from, and who is at fault.

Most of used tires are generated at retail tire outlets, where the scrap tires are typically collected and transported to various locations: tire dump sites, transfer stations, shredding facilities, utility boilers, cement kilns and other locations. There have been some conventional solutions for addressing the issues of economics of scrap tires handling and transportation, for example U.S. Pat. Nos. 5,590,594; 5,676,320; 6,098,531; 6,315,223. These solutions provide either baling a large amount of tires at a time or shredding them in order to reduce their cubic volume, thereby providing a more economic commodity for transportation. (Transportation costs are a major component of the total costs in the scrap tire collection business.) There are several drawbacks with these methods. The biggest problem associated with baling or shredding tires is that large amounts of tires have to be collected and stored before a mobile processing unit can arrive on site. Also, bales of tires are very heavy and require forklifts for handling (which are not a standard equipment at tire outlets). Shredding the tires produces a lot of dust that is very flammable, requires a front loading truck for handling the shreds and not every location described above will accept pre-shredded tires.

U.S. Pat. No. 5,809,875 describes an apparatus for crushing vehicle wheels. A frame includes three radially dispersed rectangular tube beams each mounting a hydraulic cylinder and a crushing head which converge and operate radially to deform a scrap supported at the center of the frame in order to separate the steel rim of the wheel from the surrounding casing. After removing the steel rim, the tire will return to its original shape. Accordingly, this patent does not teach compacting tires to be used in recycling and maintaining the compacted tires in a compacted form.

It is desirable to provide a method and system for individual tire recycling and tracking.

SUMMARY OF THE INVENTION

The invention relates to a method and system for recycling individual scrap tires by crushing individual tires. The method eliminates or reduces the costs associated with conventional methods of storing, handling, and transporting the scrap tires. The invention also provides a method of tracking the scrap tires on the way from the scrap tire generator to the end destination by marking the scrap tires with unique numbers that will be traceable, identifying the origin of the scrap tire, thereby preventing accumulation of illegal tire dumps (disposal sites).

The method of the present invention for handling scrap tires, includes a step of providing a compacting apparatus to a scrap tire generator, such as a tire retailer. Before compacting the tires, the tire can be marked with a unique identifier assigned to every tire generator. By marking the scrap tires with a unique identifier, the scrap tires can be tracked on their way to the final destination. The compacting apparatus provides volume reduction of the scrap tires individually into a form that can have a reduction of at least fifty percent of original cubic volume. The tires can be pinched to maintain the compacted tire in the compacted form and prevent the compacted tire from regaining its original shape. The compacted scrap tires can be accumulated inside a tire collection enclosure, such as a trailer or dumpster. The collected tires can be transported with much more weight efficient loads of the tires to a transfer station, a recycling facility, or an end user.

The invention will be more fully described by reference to the following drawings.

DETAILED DESCRIPTION

Figure 1:
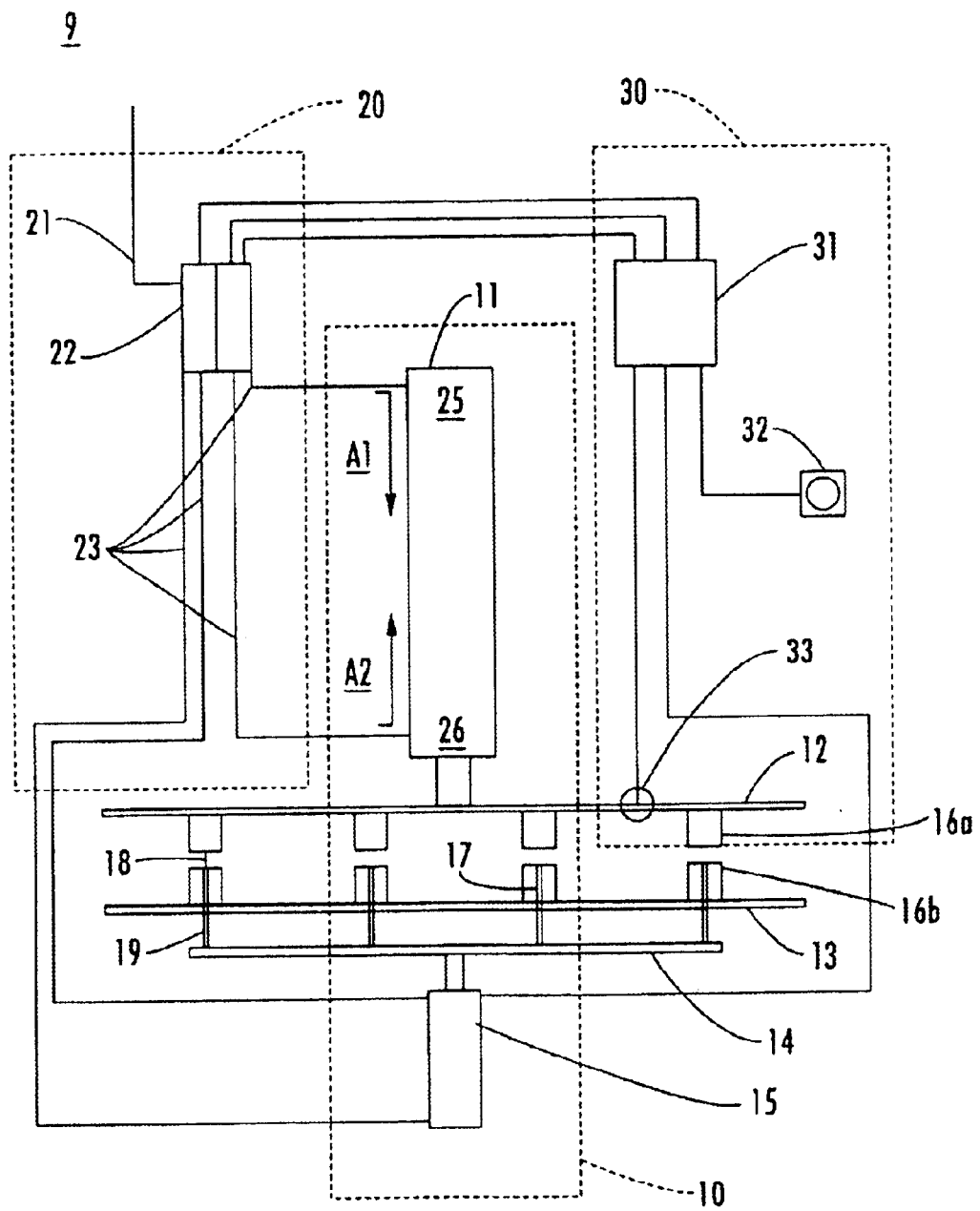
FIG. 1 is a schematic plan view of an individual tire compacting apparatus in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates tire compacting apparatus 9, including mechanism assembly 10, compressed air system 20, and control system 30. Mechanism assembly 10, compressed air system 20 and a control system 30 can be supported in a conventional manner using a body assembly (not shown).

Mechanism assembly 10 includes main piston cylinder 11, crushing plates 12 and 13, and pinching device 35. Main piston cylinder 11 moves crushing plate 12 toward and away from crushing plate 13. Main piston cylinder 11 can be of compressed air or hydraulic configuration.

Compressed air system 20 includes compressed air supply line 21, compressed air valves 22 and lines 23. Compressed air system 20 supplies compressed air through compressed air lines 23 to either front end 25 of main piston cylinder 11 to activate main piston cylinder 11 in the direction of arrow $A_1$ or back end 26 of main piston cylinder to retract main piston cylinder 11 in the direction of arrow $A_2$. Valves 22 open and close to supply air from air supply line 21. Compressed air system 20 can be a conventional system.

Control system 30 includes control module 31, operator controls 32 and proximity sensor 33. Control system 30 can be a conventional system and include other devices. Operator controls 32 can be used to activate control module 31. Control module 31 controls the movement of crushing plate 12 toward and away from crushing plate 13 by controlling compressed air system 20. Control module 31 sends a signal to valves 22 for opening and closing valves 22. Proximity sensor 33 sense the distance between crushing plates 12 and 13 and sends a signal to control module 31 which activates valves 22. A body assembly (not shown) can include a frame, outside enclosure panels, an access door, and operator controls 32.

Figure 2:
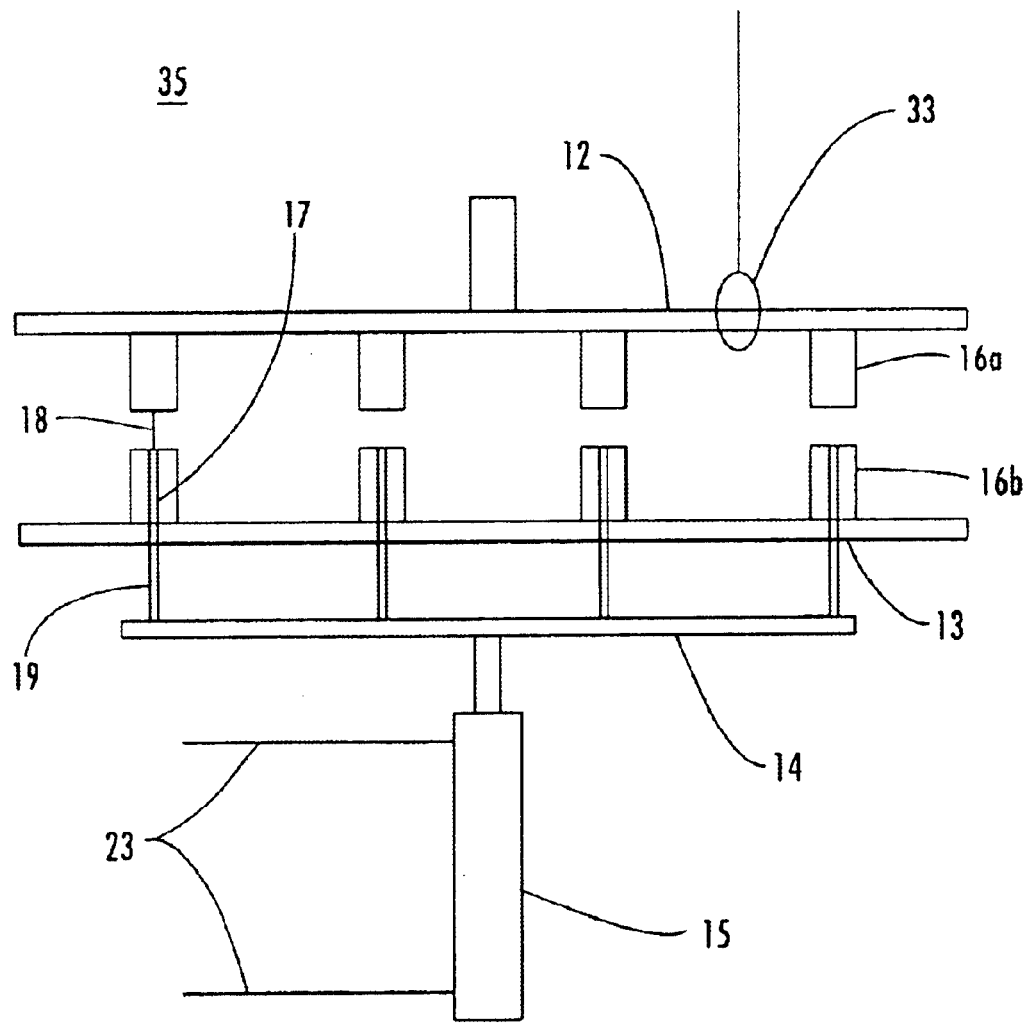
FIG. 2 is a schematic plan view showing details of the pinching device, which is a part of the compacting apparatus shown in FIG. 1.

FIG. 2 illustrates pinching device 35 comprised of piston cylinder 15, pinching mechanism 14, protrusions 16, drive bushings 17, coupling element 18 and push pins 19. Lines 23 supply compressed air to piston cylinder 15. A plurality of protrusions 16a and 16b extend at predetermined positions along respective crushing plates 12 and 13. Drive bushings 17 are formed inside protrusions 16b. Drive bushings 17 provide a guide for push pins 19. Coupling element 18 is positioned in between crushing plates 12 and 13. Push pins 19 move forward inside drive bushings 17 for forcing coupling element 18 out of drive bushing 17 and into a tire. After coupling element 18 is inserted through the tire, coupling element 18 can contact protrusion 16a of crushing plate 12 for bending coupling element 18. For example, coupling element 18 can have a wire nail form including a head and body. The body is bent backward after insertion of coupling element 18 and coupling element 18 is retained in the tire. Alternatively, coupling element 18 can be a wire, thread, staple or other conventional attachment element.

Figure 3:
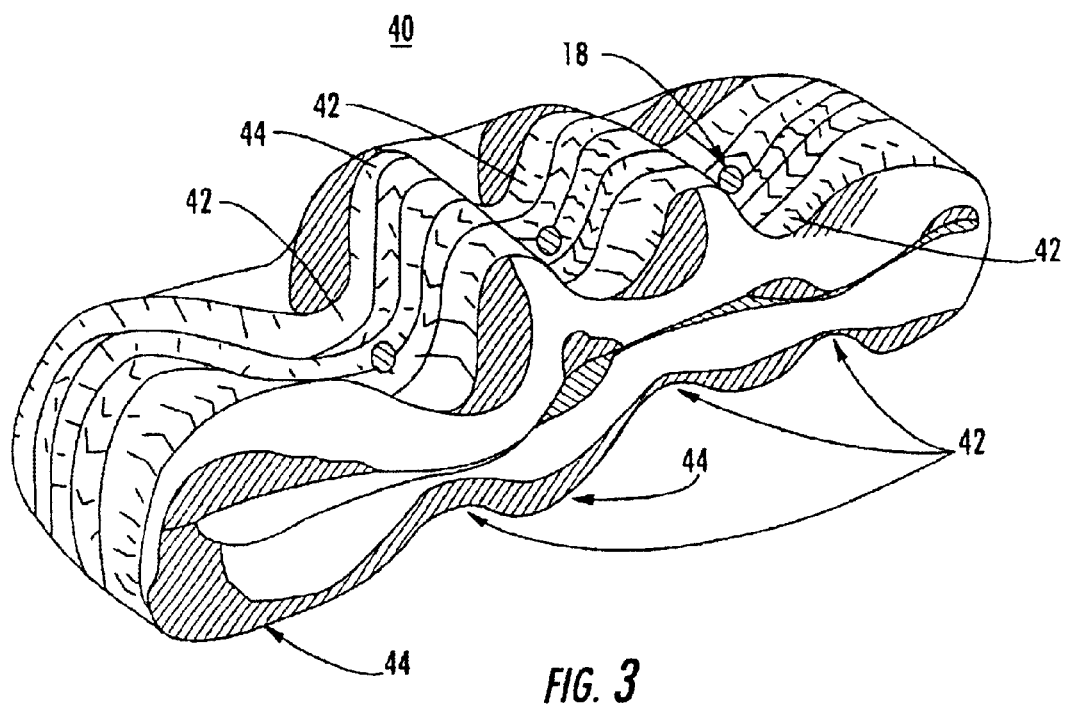
FIG. 3 is a perspective view of a compressed scrap tire after application of the compacting apparatus.

FIG. 3 illustrates an example of a form that scrap tire 40 will take after being compacted and pinched, such as being wired, sewn, nailed or stapled, in accordance with the teachings of the present invention. In the compacted form, scrap tire 40 can have a reduction of at least fifty percent of original cubic volume. A plurality of indentations 42 and protrusions 44 are formed in scrap tire 40 by contact with protrusions 16a, 16b. Coupling elements 18 can be inserted in one or more of the indentations 42 for maintaining scrap tire 40 in a compacted form. It will be appreciated that more or less indentations 42 can be formed in scrap tire 40 and more or less coupling elements 18 can be inserted into indentations 42 by pinching device 35. The drawing expresses only an approximate shape of a compressed scrap tire, since the scrap tires come in variety of sizes.

Figure 4:
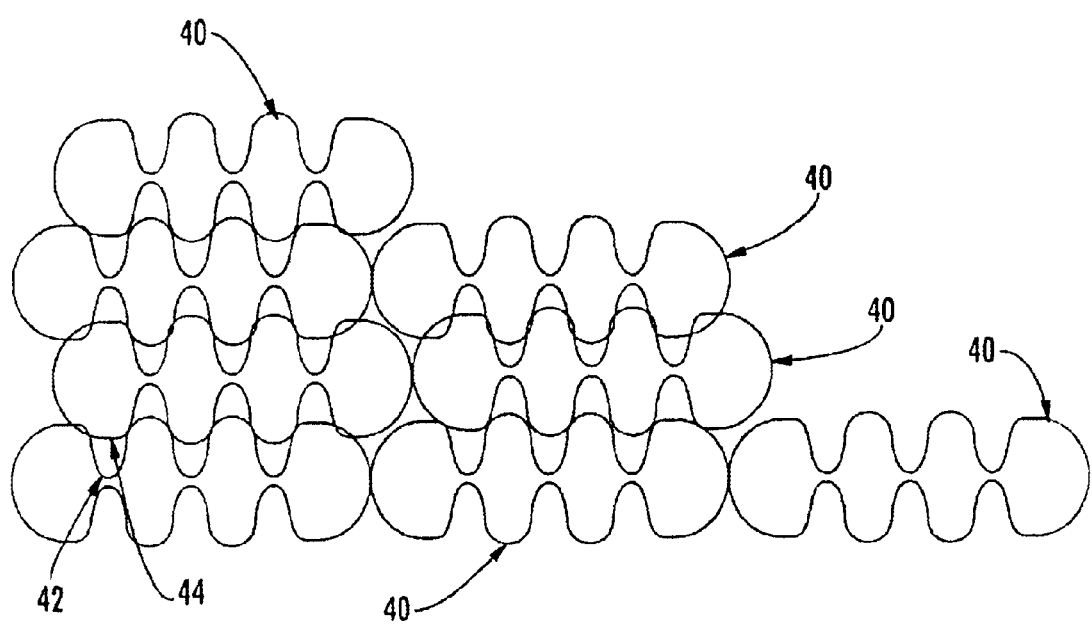
FIG. 4 is a schematic plan view of a plurality of compressed scrap tires in a stacked arrangement.

FIG. 4 illustrates a plurality of compressed tires in a stacked arrangement. Indentations 42 of a first scrap tire 40 are aligned with protrusions 44 of an adjacent scrap tire 40. The method of stacking the compressed tires is designed to be an economical space saving way of storing pinched scrap tires 40, as shown in FIG. 3. It will be appreciated that other ways of stacking the compressed tires can be used.

Figure 5:
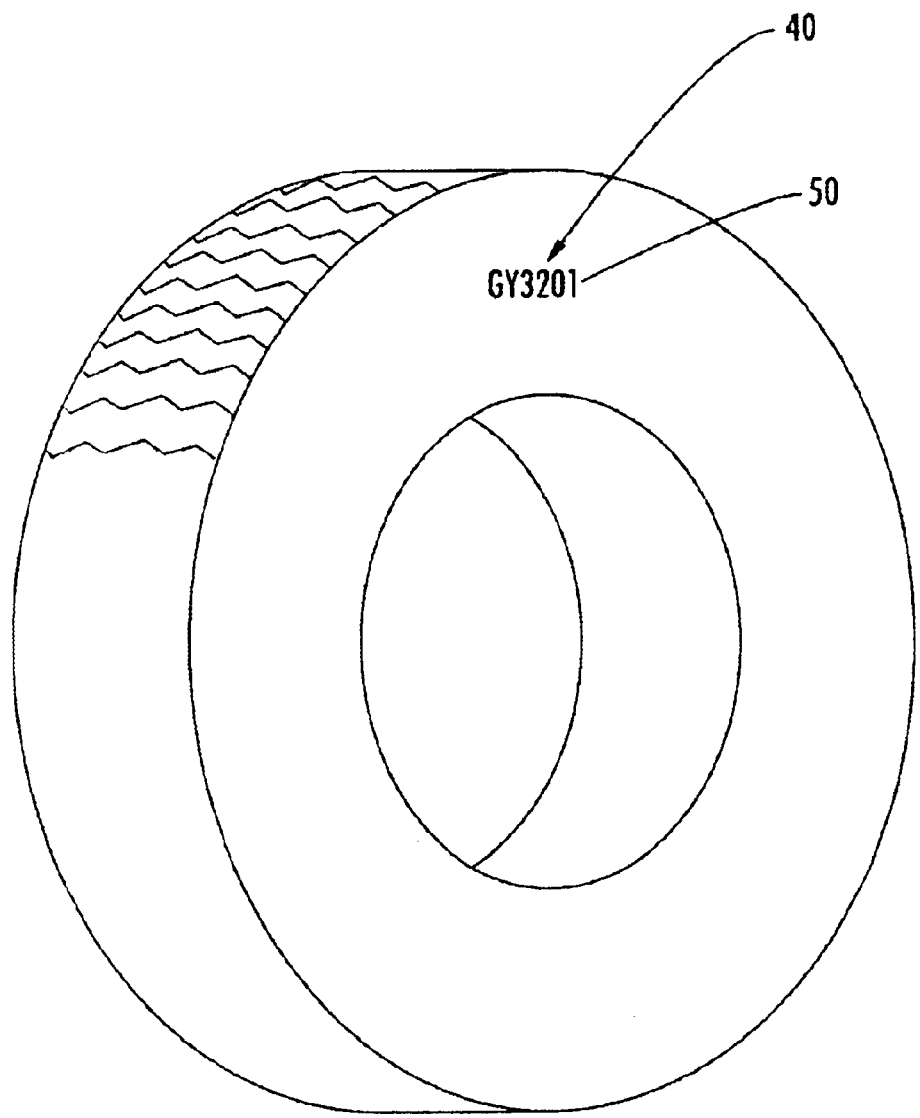
FIG. 5 is a schematic view of an example of a unique identifier marked on a scrap tire to be recycled in accordance with the present invention.

FIG. 5 illustrates an embodiment of the present invention in which an identifier 50 is marked on scrap tire 40. For example, identifier 50 can be a sequence of letters, numbers or symbols. Identifier 50 can be unique for every scrap tire generator and be composed of at least four digits. The marking of identifier 50 on scrap tire 40 can be achieved by stamping, printing, branding or in any other known manner to those skilled in art. Identifier 50 can be placed on any position on scrap tire 40.

Figure 6:
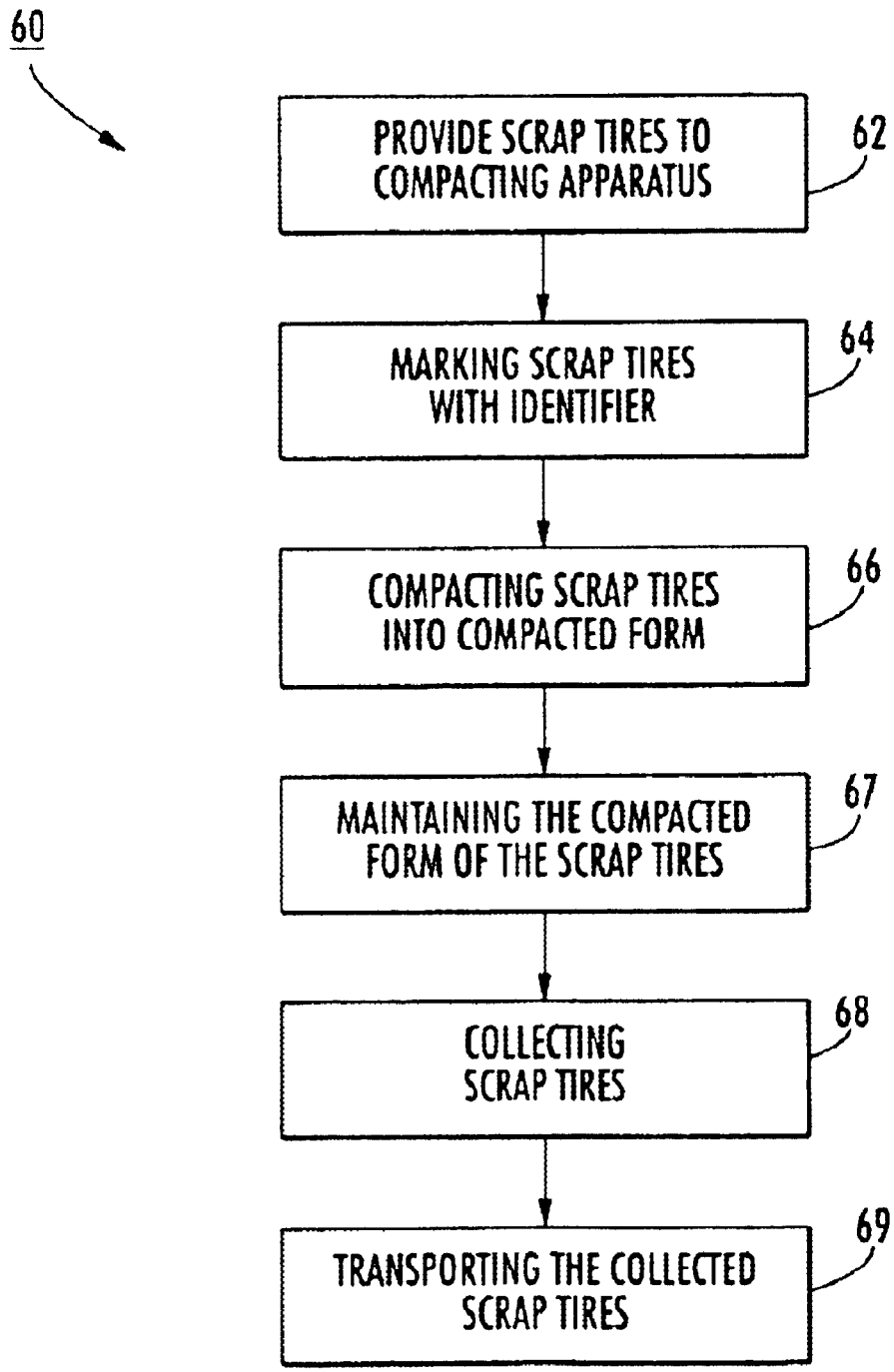
FIG. 6 is a schematic plan view showing a method of the present invention for recycling a scrap tire.

FIG. 6 illustrates the method of the present invention for recycling scrap tire 60. In block 62, scrap tires are provided to compacting apparatus of the present invention. For example, the scrap tires can be provided by a scrap tire generator, e.g., tire retailer to the compacting apparatus. In block 64, the scrap tires are optionally marked with a unique identifier corresponding to an assigned tire generator. In block 66, the scrap tires are volume reduced by compacting individual scrap tires one at the time using the compacting apparatus into a form that will have a reduction of at least fifty percent of original cubic volume. In block 67, the compacted form of the scrap tire is maintained such as by pinching and retention with a coupling element, as described above. In block 68, the compressed scrap tires are collected such as by accumulating inside a tire collection enclosure. For example, the tire collection enclosure can be a designated space, trailer or, but not limited to, dumpster. In block 69, the collected tires are transported to a transfer station, a recycling facility, or an end user. Volume reduction achieved by applying present invention provides more weight efficient loads of the tires, thereby lowers the transportation costs.

By the method of the present invention, the scrap tire generator can provide for compressing the tires, and a scrap tire collector can transport them to a collection facility, transfer station, recycling facility or the end user. By utilizing the shipping manifest that bares an identifier that is assigned to each tire generator, scrap tires marked with the identifier can be tracked on their way to the final destination.

During operation of compacting apparatus 9, an operator such as a tire generator facility's employee, opens an access door (not shown), loads drive bushings 17 with coupling elements 18, places scrap tire 40 in mechanism assembly 10, between crushing plates 12 and 13, and closes the access door (not shown). Control button 32 is actuated by the operator to start the process of compacting scrap tire 40, by delivering the compressed air or pressurized hydraulic fluid to main piston cylinder 11. Main piston cylinder 11 moves crushing plate 12 towards crushing plate 13. After main piston cylinder 11 reaches full extension, proximity sensor 33 actuates valves 22 to deliver compressed air or pressurized hydraulic fluid to piston cylinder 15 for actuating pinching device 35. Pinching device 35 operates to pierce compressed scrap tire 40 with coupling elements 18. Coupling elements 18 can be bent by contact with anvils (not shown) located directly opposite corresponding drive bushings 17. Coupling elements 18 can be wire nails which can be bent rearwardly to prevent scrap tire 40 from regaining its original shape. Thereafter, control module 31 actuates main piston cylinder 11 to move crushing plate 12 to its starting position, this will enable the operator to open the access door (not shown), and remove compressed scrap tire 40 from compacting apparatus 9. After removal of scrap tire 40 from compacting apparatus 9, scrap tire 40 can be placed on removal equipment such as a hand truck, and the process can be repeated for another individual tire. When a predetermined amount of scrap tires 40 have been crushed and placed on the hand truck, the operator can transfer the scrap tires 40 to a tire collection enclosure such as a designated space, trailer or, but not limited to, self dumping container.

Generally, the present invention greatly reduces the amount of labor involved in loading the tires one at the time on to the trailers/containers, or eliminates the need for an expensive forklift truck to load heavy bales of tires on to the flatbed trucks, further greatly reduces the costs associated with transporting small weight loads, provides an alternative to the expense of keeping the insured and registered trailers for extended periods of time parked at the scrap tire generator's location by utilizing self dumping containers, provides a way to track the scrap tires to its source of origin by the means of original and unique number placed on the scrap tire, thereby further reducing the chances of those tires to be illegally dumped, and further yet preventing or limiting the mosquitoes born diseases by disabling illegal disposal of the scrap tires.

Although the invention has been illustrated by the preceding description, it is not intended to be construed as being limited to the specific preferred embodiments employed therein. Modifications, changes, and improvements to the preferred forms of the invention herein disclosed, described, and illustrated may occur to those skilled in the art who come to understand the principles and precepts thereof. Accordingly, the scope of the patent to be issued hereon should not be limited to the particular embodiments of the invention set forth herein, but rather should be defined by the advance by which the invention has promoted the art. Whereas particular embodiments of the invention have been described herein above, for purposes of illustration, it will be evident to those skilled in the art that numerous variations of the details may be made without departing from the invention as defined in the appended claims.

What is claimed is:

1. A system for recycling an individual tire comprising:
   means for compacting said individual tire into a compacted form;
   means for pinching said individual tire in said compacted form at one or more locations; and
   means for inserting a coupling element at the pinched locations of said individual tire.

2. The system of claim 1 wherein in said compacted form a cubic volume of said individual tire is reduced by at least fifty percent.

3. The system of claim 1 wherein said means for compacting said individual tire comprises a first crushing plate, a second crushing plate and a main piston cylinder coupled to said first crushing plate, said main piston cylinder moving said first crushing plate toward and away from said second crushing plate.

4. The system of claim 3 wherein said main piston has a compressed air or hydraulic configuration.

5. The system of claim 3 further comprising a proximity sensor for sensing a distance between said first crushing plate and said second crushing plate, said proximity sensor activating said means for maintaining said individual tire in compacted form when said main piston cylinder reaches full extension.

6. The system of claim 1 wherein said coupling element is a nail, staple, wire or thread.

7. The system of claim 1 further comprising:
   means for marking said individual tire before using said means for compacting with an identifier of a scrap tire generator.

8. The system of claim 7 wherein said identifier represents identification of a tire generator.

9. The system of claim 7 wherein said identifier is a sequence of letters, numbers or symbols.

10. A system for recycling an individual tire comprising:
    means for compacting said individual tire into a compacted form;
    means for pinching said individual tire in said compacted form at one or more locations; and
    means for inserting a coupling element at the pinched locations of said individual tire wherein said means for pinching comprises one or more protrusions extending from a first crushing plate and from a second crushing plate.

11. A system for recycling an individual tire comprising:
    means for compacting said individual into compacted form;
    means for pinching said individual tire in said compacted form at one or more locations; and
    means for inserting a coupling element at the pinched locations of said individual tire wherein said means for pinching comprises one or more protrusion extending from a first crushing plate and from a second crushing plate, wherein said coupling element is held by a drive bushing to each of said one or more protrusions.

* * * * *